United States Patent
Ogura

(10) Patent No.: US 9,596,369 B2
(45) Date of Patent: Mar. 14, 2017

(54) FUNCTION EXECUTION APPARATUS, FUNCTION EXECUTION METHOD, AND NON-TRANSITORY COMPUTER READABLE MEDIUM STORING INSTRUCTIONS THEREFOR

(71) Applicant: BROTHER KOGYO KABUSHIKI KAISHA, Nagoya, Aichi (JP)

(72) Inventor: Sho Ogura, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 14/870,319

(22) Filed: Sep. 30, 2015

(65) Prior Publication Data

US 2016/0094735 A1 Mar. 31, 2016

(30) Foreign Application Priority Data

Sep. 30, 2014 (JP) .................................. 2014-199911

(51) Int. Cl.
*H04N 1/00* (2006.01)

(52) U.S. Cl.
CPC ..... *H04N 1/00389* (2013.01); *H04N 1/00392* (2013.01); *H04N 1/00424* (2013.01); *H04N 1/00427* (2013.01); *H04N 1/00432* (2013.01); *H04N 1/00482* (2013.01); *H04N 2201/0094* (2013.01)

(58) Field of Classification Search
USPC ....................................................... 358/1.15
See application file for complete search history.

(56) References Cited

U.S. PATENT DOCUMENTS

2006/0187483 A1* 8/2006 Baba ................... H04N 1/00389
                                                    358/1.15
2007/0027895 A1* 2/2007 Bridges ................. G06Q 10/10
2015/0286445 A1* 10/2015 Kittaka ............... G06F 3/04817
                                                    358/1.15

FOREIGN PATENT DOCUMENTS

JP        2009-104340 A       5/2009

* cited by examiner

*Primary Examiner* — Ngon Nguyen
(74) *Attorney, Agent, or Firm* — Scully, Scott, Murphy & Presser, P.C.

(57) ABSTRACT

A function execution apparatus has a display, a scanner, and a controller. The controller is configured to execute a key display process in which at least one shortcut key is displayed on a display, and a multiple functions assigning process in which the controller assigns multiple particular functions to a multiple-function assigned key which is a shortcut key. Each of the multiple functions is associated with a scanning operation in which a scanner scans an image on the original, and a multiple functions execution process in which the controller executes the multiple functions assigned to the multiple-function assigned key when a user operation to select the multiple-function assigned key is done such that only one scanning operation is executed and the multiple functions are executed based on scan data obtained by one scanning operation instead of executing the scanning operation for each of the multiple functions.

15 Claims, 11 Drawing Sheets

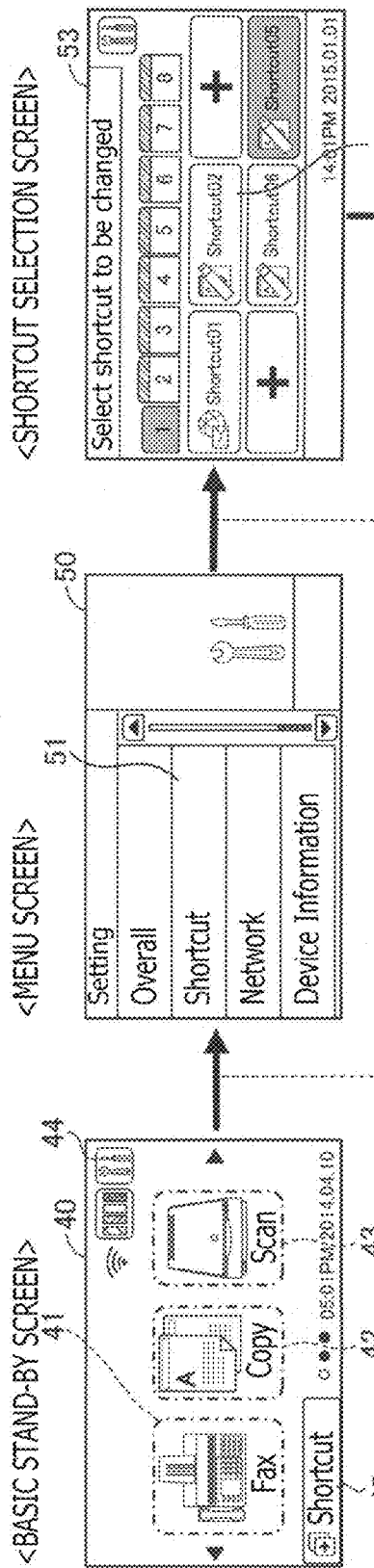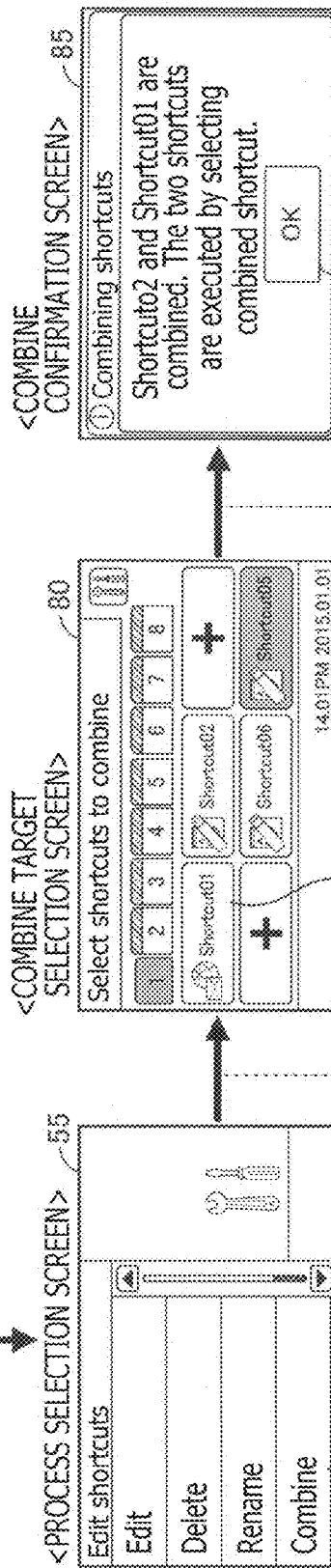

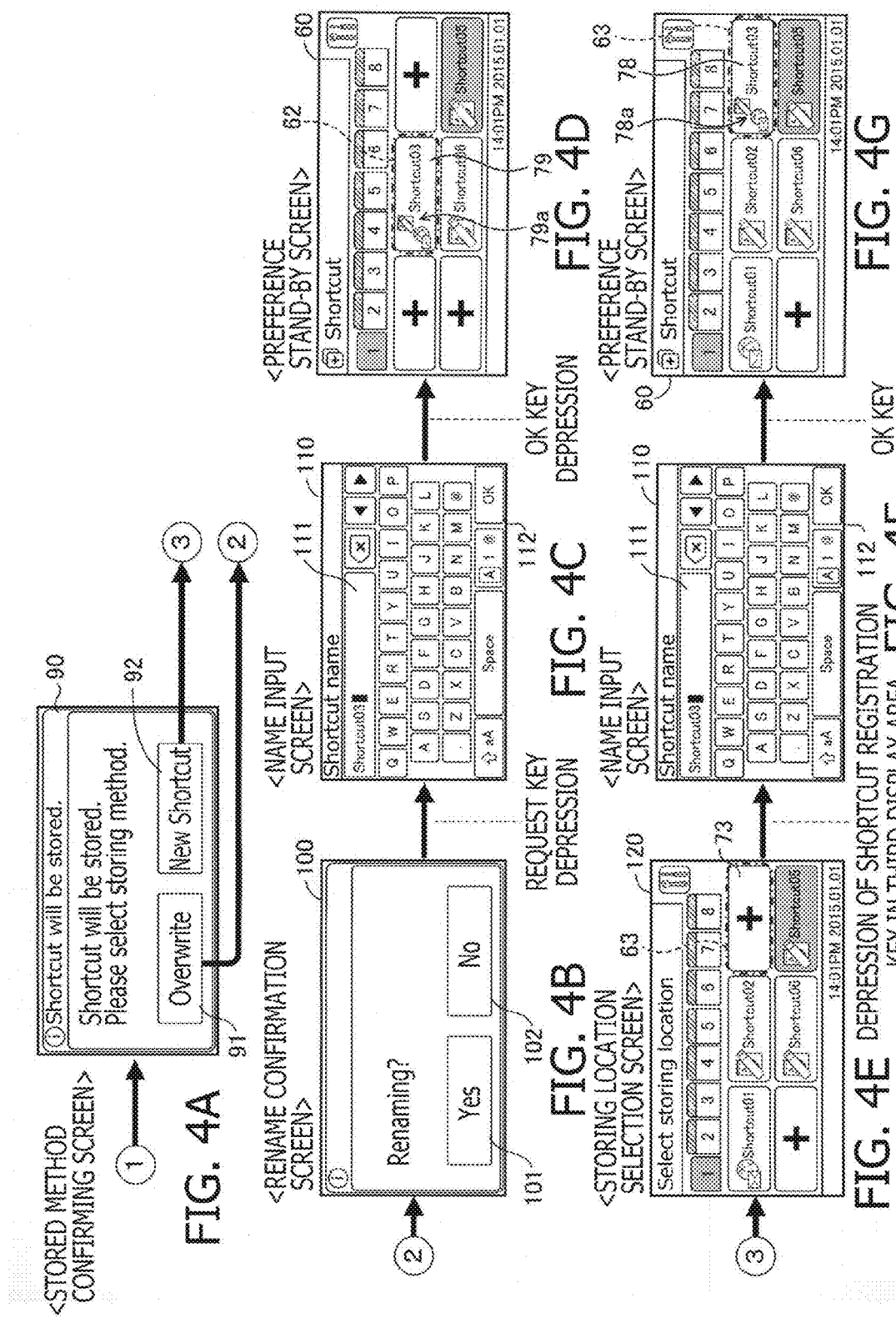

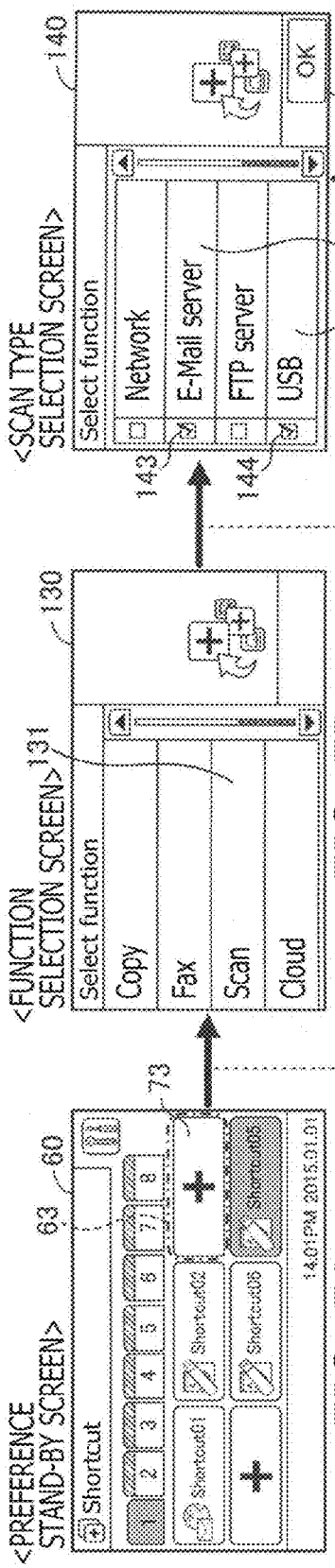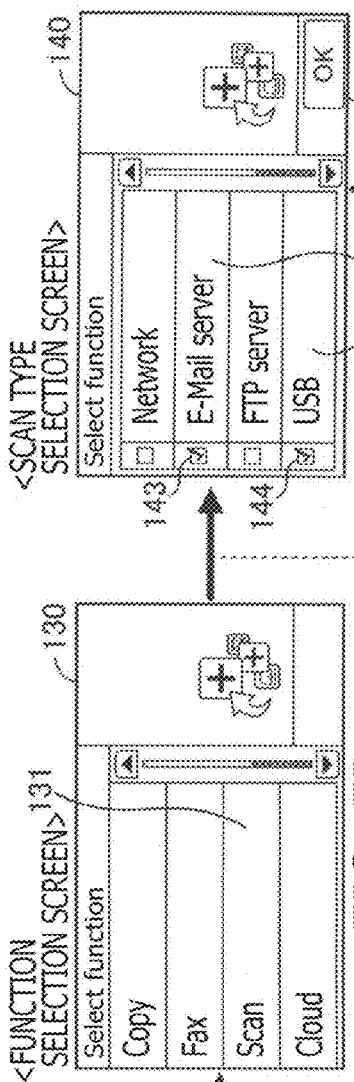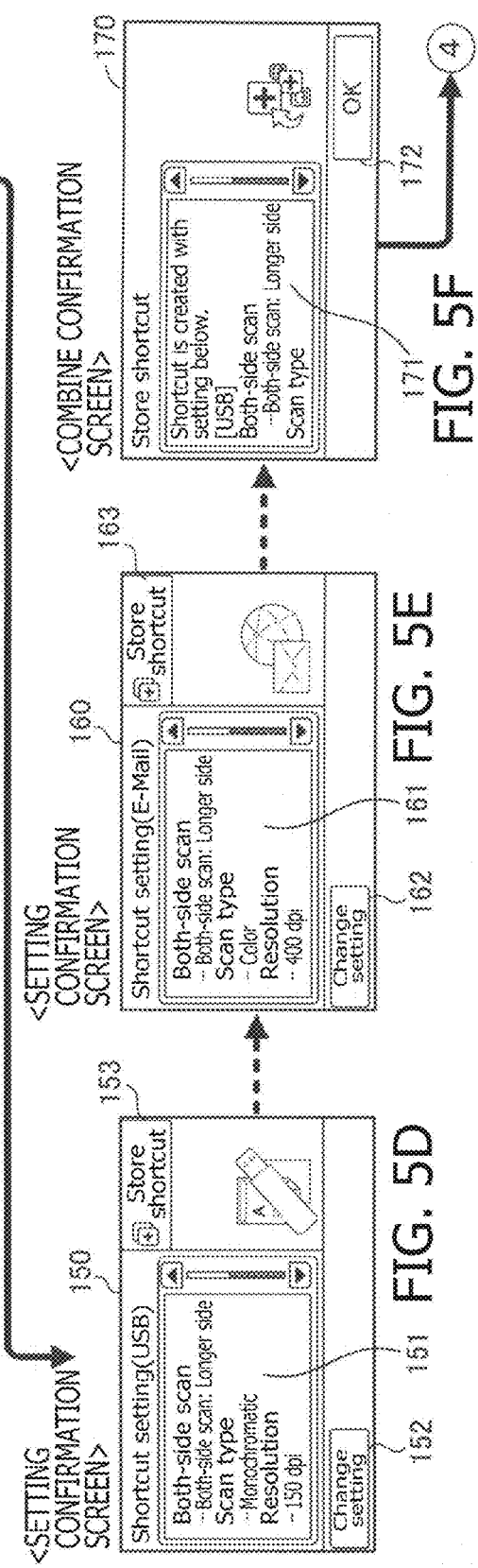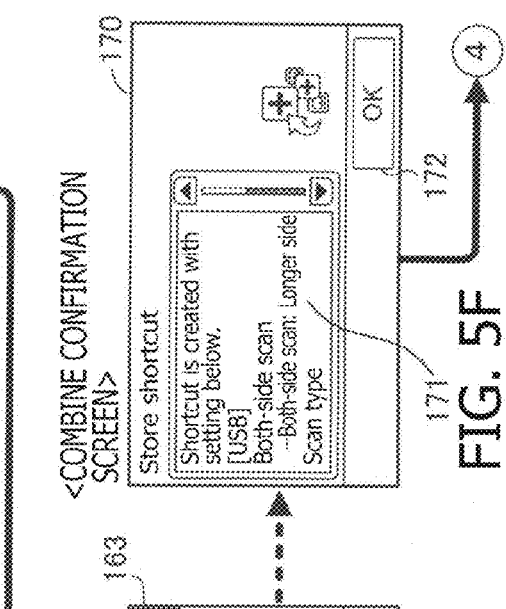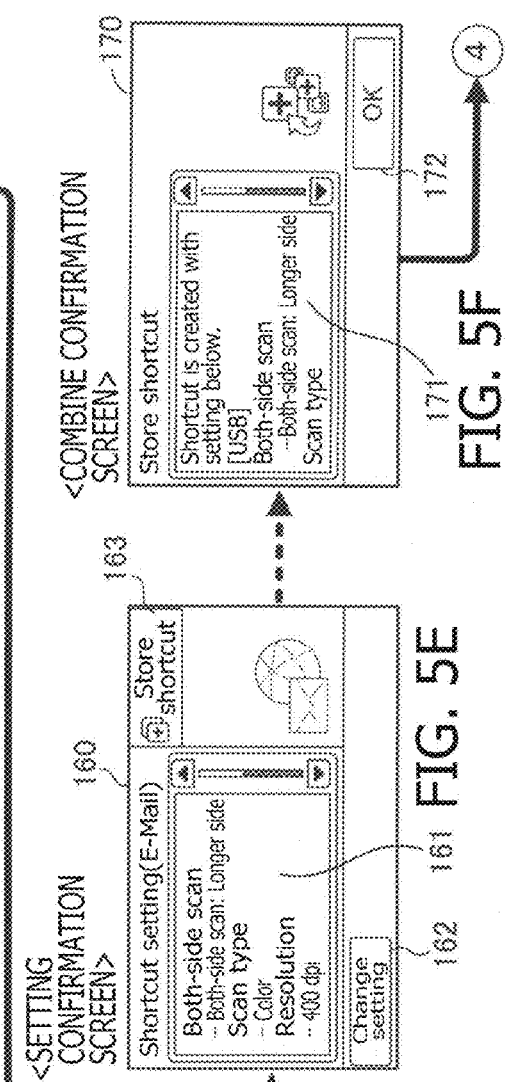

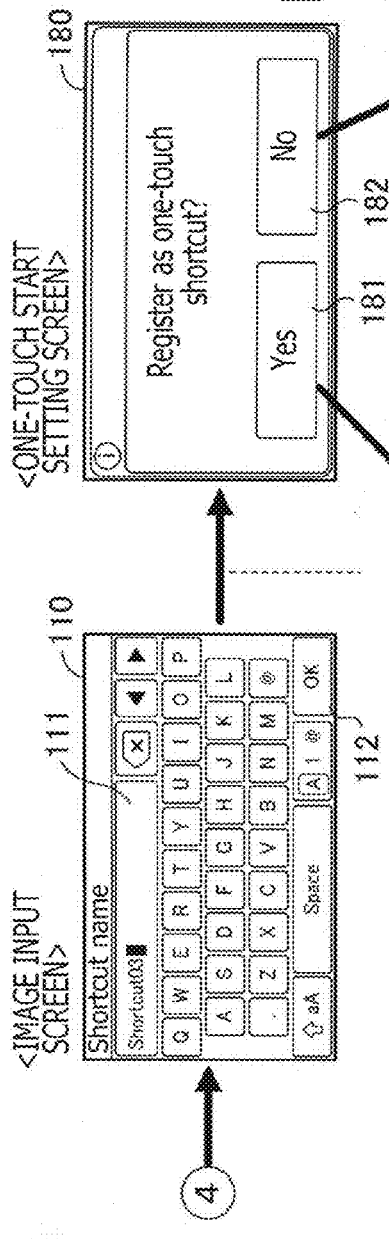

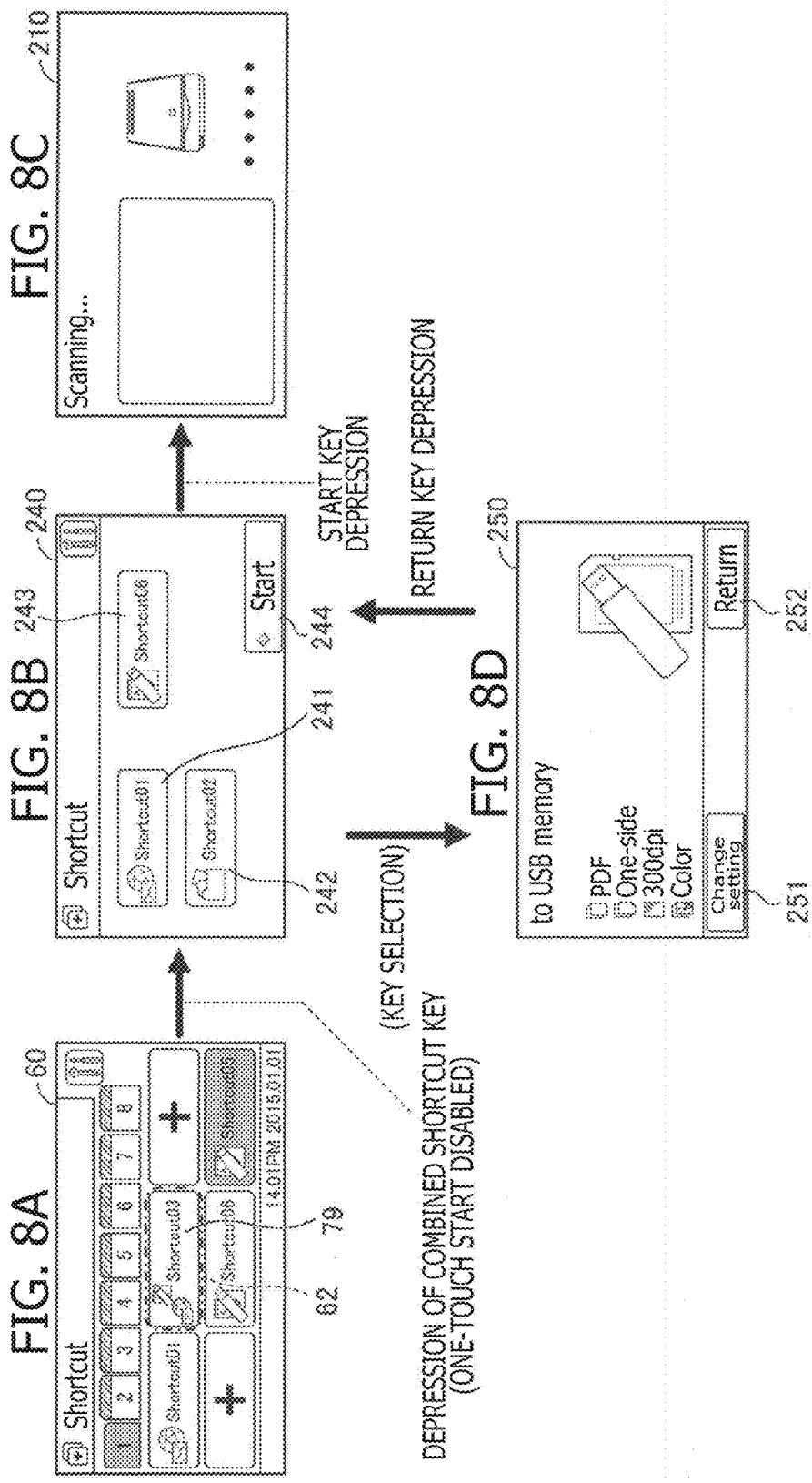

FUNCTION EXECUTION APPARATUS, FUNCTION EXECUTION METHOD, AND NON-TRANSITORY COMPUTER READABLE MEDIUM STORING INSTRUCTIONS THEREFOR

CROSS-REFERENCE TO RELATED APPLICATION

This application claims priority under 35 U.S.C. §119 from Japanese Patent Application No. 2014-199911 filed on Sep. 30, 2014. The entire subject matter of the application is incorporated herein by reference.

BACKGROUND

Technical Field

The present disclosures relate to a function execution apparatus capable of executing a plurality of functions, a method of executing such functions, and a non-transitory computer readable recording medium storing instructions which, when executed by a computer, causes the computer to execute such a method.

Related Art

A function execution apparatus capable of scanning an image of an original sheet, and applying various types of processing to the scanned image has been widely known. In such a function execution apparatus, a "shortcut" which is a command or the like that activates a particular function based with particular setting values is generally used. When such a shortcut is registered in advance, a user can activate the registered function which typically includes a plurality of steps of process with a simple operation (e.g., by depressing a shortcut key).

SUMMARY

In a conventional function execution apparatus, even when multiple shortcuts are registered, which have common steps, functions respectively corresponding to the multiple shortcuts are executed individually.

For example, it is assumed that a first function has a step of scanning an image on an original and a step of transmitting the scanned image data by attaching an e-mail to an external device, and a second function has a step of scanning an image on the original and transmitting the scanned image data to a web server via the Internet are registered as first and second shortcuts, respectively. When a user wishes to executed both the first and second functions, user can do the same by depressing shortcut keys to which the first and second shortcuts are respectively assigned. In such a case, however, the steps of scanning an image included in the first function and the step of scanning an image included in the second function are executed respectively when the respective functions are executed. That is, in the above case, even though the same image is to be scanned, the step of scanning the image is repeated when each function is executed.

As in the above-described example, when the same step or operation is executed for each shortcut, a time period required for an entire operation of the function is elongated. Further, when the function execution apparatus is configured such that multiple original documents can be automatically scanned with use of automatic document feeder, the user is required to set the original document for execution of each shortcut.

In consideration of the above, aspects of the present disclosures provide an improved function execution apparatus with which efficiency of an entire process of the function execution apparatus when multiple shortcuts including a common steps can be improved.

According to aspects of the disclosures, there is provided a function execution apparatus, which has a display device configured to display an image, a scanner configured to scan an image on an original to generate the scan data representing the image on the original, and a controller configured to execute anyone of multiple functions. The controller is configured to execute a key display process in which the controller displays at least one shortcut key on the display device, a multiple functions assigning process in which the controller assigns multiple particular functions to a multiple-function assigned key which is one of the at least one shortcut key, each of the multiple functions being associated with a scanning operation in which the scanner scans the image on the original, and a multiple functions execution process in which the controller executes the multiple functions assigned to the multiple-function assigned key when a user operation to select the multiple-function assigned key is done such that only one scanning operation is executed and the multiple functions are executed based on scan data obtained by only one scanning operation instead of executing the scanning operation for each of the multiple functions.

According to aspects of the disclosures, there is provided a function execution method, which includes a multiple functions assigning step of assigning multiple particular functions to shortcut key that can be displayed on a display device, each of the multiple functions being associated with a scanning operation to scan an image on an original, a displaying step of displaying a multiple-function assigned key which is the shortcut key to which the multiple functions are assigned in the multiple functions assigning step on a display device, and a multiple functions execution step of executing the multiple functions assigned to the multiple-function assigned key when a user operation to select the multiple-function assigned key is done such that only one scanning operation is executed and the multiple functions are executed based on scan data obtained by only one scanning operation instead of executing the scanning operation for each of the multiple functions.

According to aspects of the disclosures, there is provided a function execution apparatus, which has a display, an image scanner configured to scan an image on an original and generate scan data representing the image on the original, and a controller. The controller is configured to execute displaying a first shortcut key and a second shortcut key on the display, assigning a first shortcut function to the first shortcut key, the first shortcut function including a scanning function and a first function, wherein the scanning function is executed by the image scanner, assigning a second shortcut function to the second shortcut key, the second shortcut function including the scanning function and a second function, the second function being different from the first function, assigning the first shortcut key and the second shortcut key to a third shortcut key. The controller is further configured to execute, in response to a designation of the third shortcut key, executing the scanning function and the first function such that first scan data is generated by the image scanner and the first scan data is used in the first function, and after executing the scanning function according to the first shortcut key, executing the second function without executing the scanning function, wherein the first scan data is used in the second function.

DETAILED DESCRIPTION OF THE ACCOMPANYING DRAWINGS

FIGS. 3A-3F show a chart graphically illustrating, together with FIGS. 4A-4G, a part of a process of creating a combined shortcut based on a first combined shortcut registration pattern according to the illustrative embodiment.

FIGS. 4A-4G show a chart graphically illustrating, together with FIGS. 3A-3F, a remaining part of the process of creating a combined shortcut based on the first combined shortcut registration pattern according to the illustrative embodiment.

FIGS. 5A-5F is a chart graphically illustrating, together with FIGS. 6A-6D, a part of a process of creating a combined shortcut based on a second combined shortcut registration pattern according to the illustrative embodiment.

FIGS. 6A-6D is a chart graphically illustrating, together with FIGS. 5A-5F, a remaining part of the process of creating a combined shortcut based on the second combined shortcut registration pattern according to the illustrative embodiment.

FIGS. 8A-8D show a chart illustrating an execution pattern C of the combined shortcut according to the illustrative embodiment.

DETAILED DESCRIPTION OF THE EMBODIMENT

(1) Configuration of Image Processing System

Figure 1:
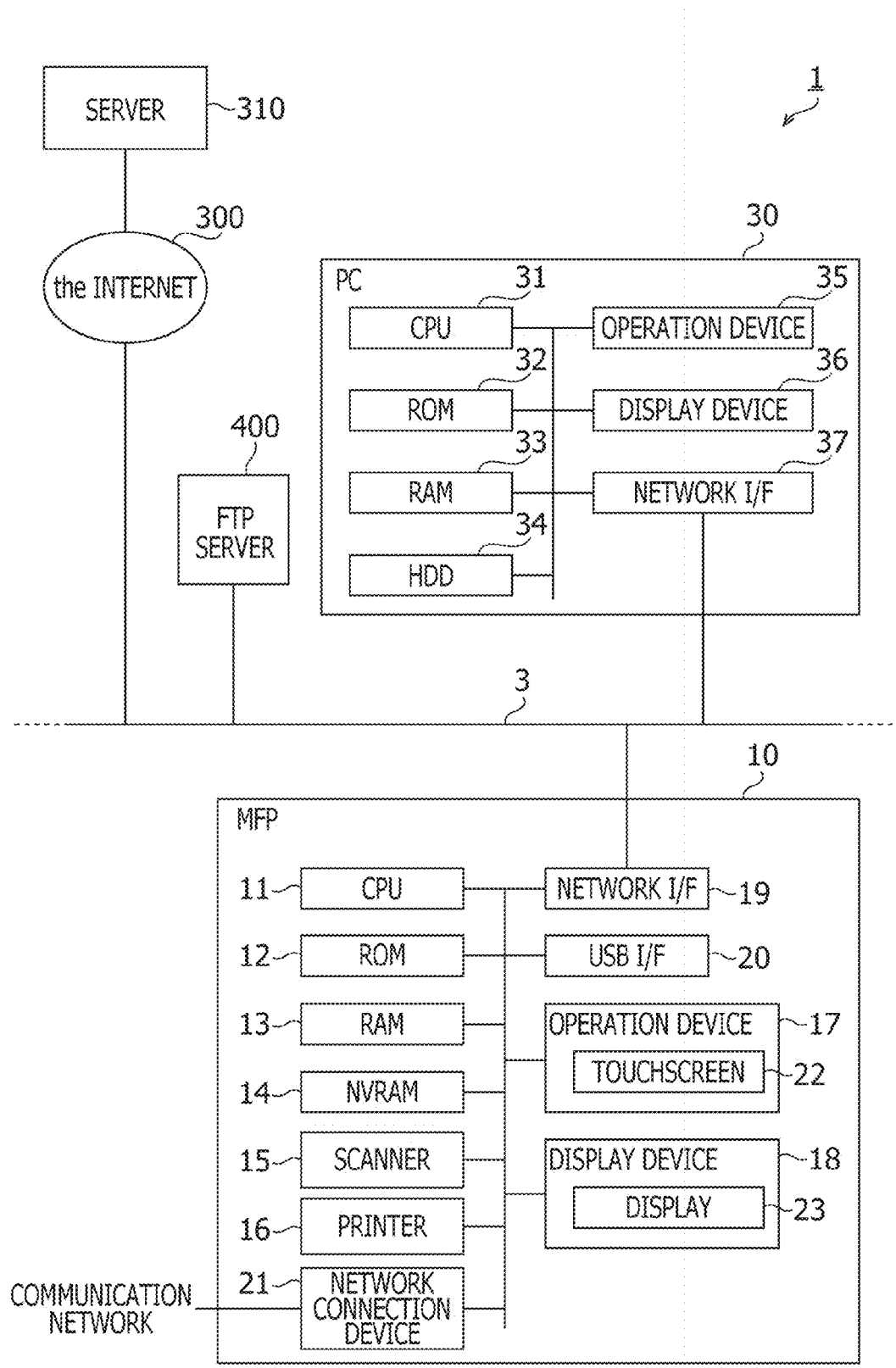
FIG. 1 is a block diagram illustrating a configuration of an image processing system according to an illustrative embodiment.

As shown in FIG. 1, an image processing system 1 according to an illustrative embodiment has an MFP (multi-function peripheral) 10 and a PC (personal computer) 30. A data communication is available between the MFP 10 and PC 30 through a LAN (local area network) 3.

The MFP 10 has multiple functions such as a scanning function of scanning an image on an original, a scan data processing function of processing data of the scanned image (hereinafter, referred to as scan data) in accordance with various types of processing, a printing function of printing out image data (which includes the scan data). A concrete example of the scan data processing function will be described later.

The MFP 10 has a CPU (central processing unit) 11, a ROM (read only memory) 12, a RAM (random access memory) 13, an NVRAM (non-volatile RAM) 14, a scanner 15, a printer 16, an operation device 17, a display device 18, a network interface 19, a USB (universal serial bus) interface 20 and a network connection device 21.

Figure 9:
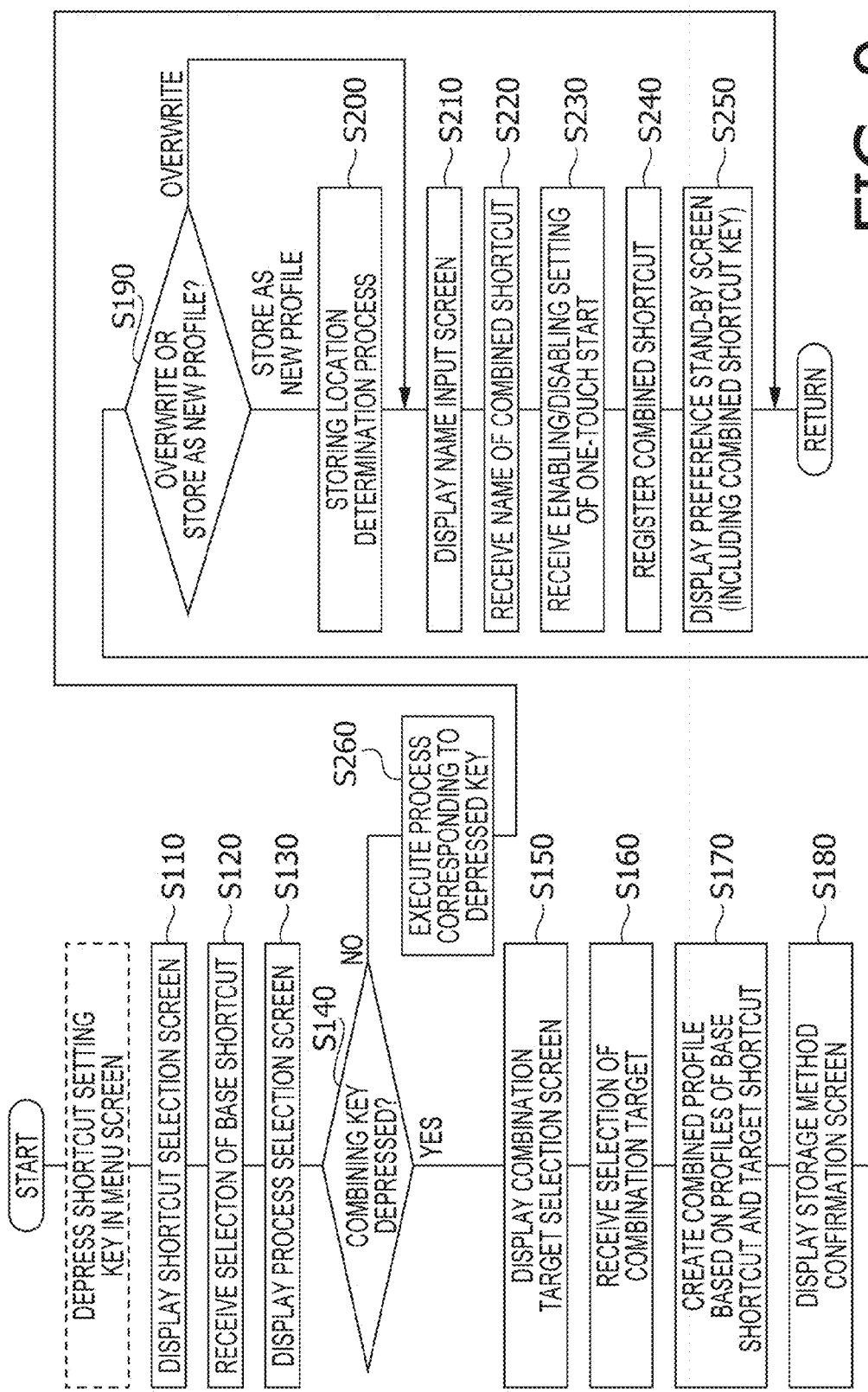
FIG. 9 is a flowchart illustrating a shortcut setting process according to the illustrative embodiment.
Figure 10:
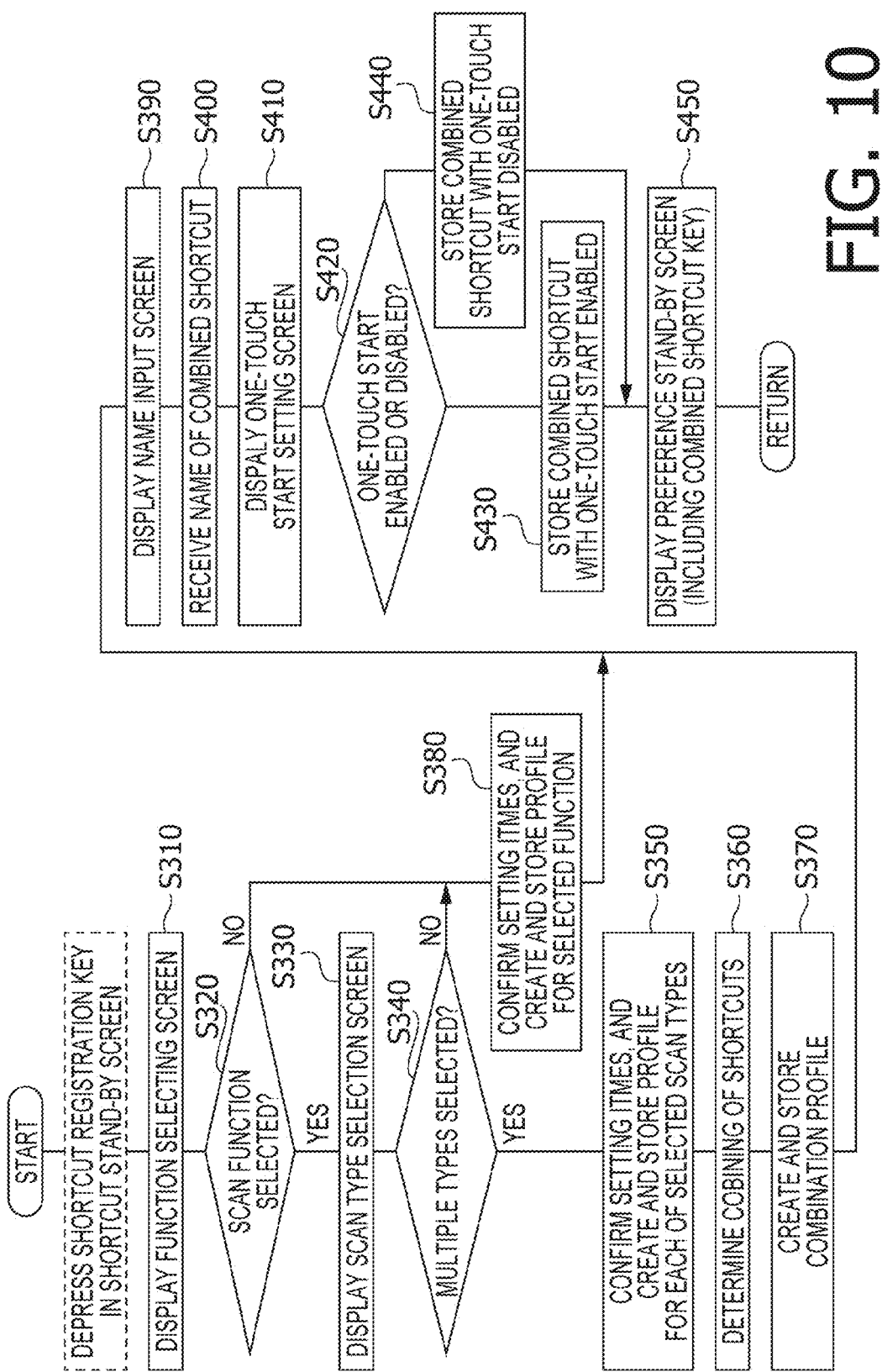
FIG. 10 is a flowchart illustrating a shortcut registration process according to the illustrative embodiment.
Figure 11:
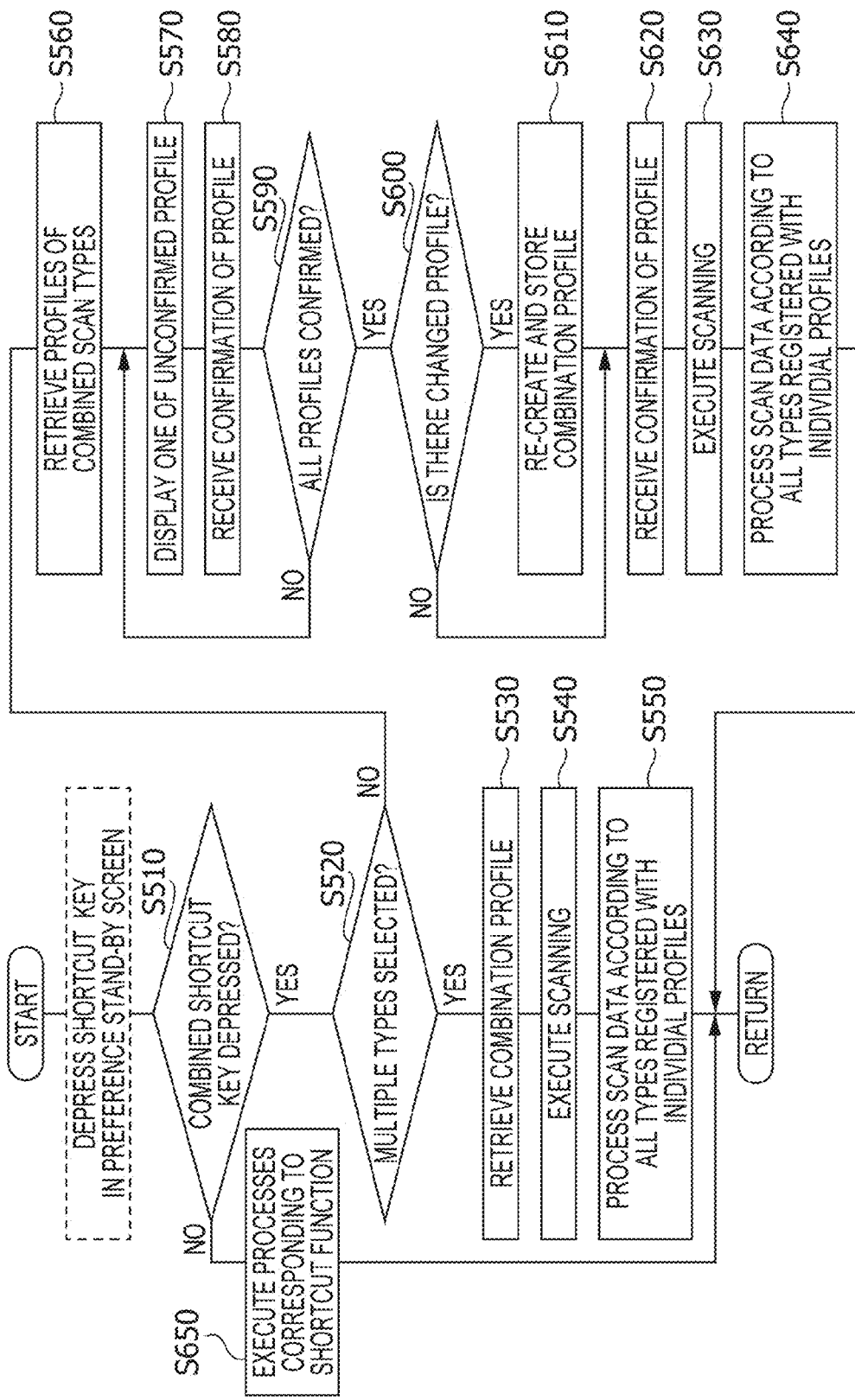
FIG. 11 is a flowchart illustrating a shortcut execution process according to the illustrative embodiment.

The CPU 11 executes programs stored in the ROM 12 or NVRAM 14 to control each component of the MFP 10 and to execute various calculations/operations. The RAM 13 is typically used as a main memory directly accessed by the CPU 11. The NVRAM 14 is an electrically rewritable non-volatile memory, and stores various pieces of setting information for the MFP 10. It is noted that setting and registration information of each of a shortcut function and a one-touch function is also stored in the NVRAM 14. It is also noted that programs respectively corresponding to processes shown in FIGS. 9-11 are stored in the ROM 12 or the NVRAM 14.

The scanner 15 has an image sensor, and scan an image on the original and generates image data representing the scanned image. The printer 16 has a function of printing various pieces of image data including the image data scanned and generated by the scanner 15 on printing medium. The operation device 17 is an inputting device through which user's operations are input to the CPU 11. The display device 18 is provided with a touchscreen 22, has display (e.g., an liquid crystal display) 23 which is capable of displaying information. On a display area of the display 23, a touchscreen 22 is overlaid. The network interface 19 is an interface necessary to connect the MFP 10 to a LAN (local area network) 9. A USB (universal serial bus) network interface used to execute a data communication in accordance with a USB standard.

The PC 30 has a CPU 31, a ROM 32, a RAM 33 and an HDD (hard disk drive) 34, the operation device 35, the display device 36 and the network interface 37.

The CPU 31 executes various programs stored in the ROM 32 and the HDD 34 to control respective components of the PC 30 and an external device (including the MFP 10). The ROM 32 stores programs and data executed/used by the CPU 31. The RAM 33 is typically used as a main memory when the CPU 31 executes various processes/operations. In the HDD 34, an OS (operation system), various device drivers, various pieces of application software are installed. The operation device 35 has a keyboard and various types of pointing devices. The display device 36 has a display such as a liquid crystal display or an OLED (organic light emitting display). The network interface 37 is a communication interface used to connect the PC 30 to the LAN 3.

An FTP (file transfer protocol) server 400 is connected to the LAN 3. The LAN 3 is connected to the Internet 300. To the Internet 300, multiple information processing devices including a server 310 are connected. According to the illustrative embodiment, the MFP 10, the PC 30 and the FTP server 400 can execute the data communication with each other through the LAN 3. Further, the MFP 10, the PC 30 and the FTP server 400 can execute the data communication with various types of information processing devices connected to the Internet 300.

(2) Scan Data Processing Function

The MFP 10 according to the illustrative embodiment has multiple types of scan data processing functions each of which processes the scan data which is generated by the scanner 15 based on the scanned image of the original. Examples of such scan data processing functions include a "Scan to PC" function, a "Scan to USB" function, a "Scan to E-mail" function, a "Scan to FAX" function, a "Scan to FTP" function, and a "Scan to Network" function.

The "Scan to PC" function is a function of transmitting scan data to a PC (e.g., the PC 30) connected to the MFP 10. "Scan to USB" is a function of transmitting the scan data to a USB memory connected to the USB interface 20 and store therein. The "Scan to E-mail" function is a function of transmitting, by an e-mail, the scan data to a particular e-mail address. The "Scan to FAX" function is a function of transmitting the scan data by facsimile through the network connection device 21. The "Scan to FTP" function is a function of transmitting the scan data to the FTP server. The "Scan to Network" function is a function of transmitting the scan data to anyone of various servers connected to the internet 300.

(3) Shortcuts

When the above-described scan data processing functions are used, generally, the user executes multiple steps. For example, when the user wishes to use the Scan to PC function, it becomes necessary for the user to execute an input operation to designate a destination PC and setting/confirming operations to set/confirm various types of setting values when a scanning operation is executed. Examples of the various types of setting values include values representing whether both-side scanning is used or not, a color setting, a resolution for scanning, a size of the original, a file type of the scan data and the like. When, for example, the "Scan to E-mail" function is used, it also becomes necessary to designate the destination mail address, setting/confirming of the various setting values when the scanning is executed. Thus, the user is required to execute a very troublesome operation if the scan data processing function is executed in accordance with a normal procedure.

According to the illustrative embodiment, the MFP 10 is configured such that shortcuts can be registered for at least the scan data processing among various functions the MFP 10 has. Then, by executed a shortcut process based on the registered shortcut, the scanning data processing function can be executed with reducing the operations of the user.

Figure 2:
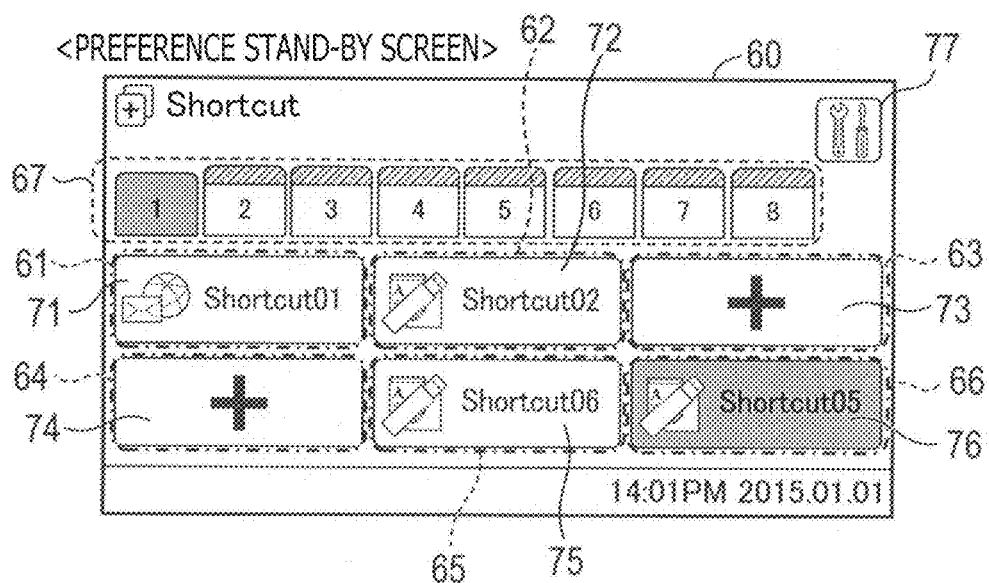
FIG. 2 is an example of a preference standby screen according to the illustrative embodiment.

According to the illustrative embodiment, the MFP 10 is configured that the total of 48 kinds of shortcuts can be registered. In order to register or executed each shortcut, a preference stand-by screen is displayed on the display 23. FIG. 2 shows an example of such a preference stand-by screen 60.

As shown in FIG. 2, on the preference stand-by screen 60, a tab display area 67 and a plurality of key display areas 61-66 are assigned. In the tab display area 67, eight tabs (first to eighths tabs) are displayed, one of which selected by the user is displayed differently from the others to indicate its selected status. In an example of FIG. 2, the leftmost tab (i.e., first tab) is in the selected status.

In the key display areas 61-66, keys corresponding to the selected tab are displayed. That is, six keys are assigned for each tab. When the selected tab is switched to another, six keys corresponding to the newly selected tab are displayed in the key display areas 61-66.

There are multiple types of keys which can be displayed in the key display areas 61-66. For example, as shown in FIG. 2, shortcut execution keys 71, 72, 75 and 76 are displayed in the key display areas 61, 62, 65 and 66, respectively. Further, shortcut registration keys 73 and 74 are displayed in the key display areas 63 and 64. To the shortcut execution keys 71, 72, 75 and 76, shortcuts having been registered are assigned, respectively. When the user operates to select one of the shortcut execution keys 71, 72, 75 and 76, the shortcut assigned to the selected key and registered with the MFP 10 is executed. The shortcut registration keys are keys to which no shortcuts have been assigned yet.

It is noted that there are various types of operations which can be employed as an input operation of the user. In the following description, thus, in the illustrative embodiment, depression of the key (i.e., user's tap with a finger or the like on an area where the key the user intends to select is displayed) is used as an example of the user input (selection) operation. As shown in FIG. 2, on the preference stand-by screen 60, a menu key 77 is displayed at an upper right area. When the user depresses the menu key 77, the user is allowed to edit the registered shortcuts. It is noted that, according to the illustrative embodiment, the user may selectively tap portions of the touchscreen 22 corresponding to positions of the displayed keys, thereby the user's selection of the keys being inputted to the CPU 11. Throughout the description, such an operation of tapping the touchscreen 22 at a position corresponding to a key will be expressed by a term "depress" for simplifying the description.

To the shortcut execution keys 71, 72, 75 and 76, profiles of the corresponding shortcuts are associated, respectively. The profile is information which is necessary to execute the function of the registered shortcut. Specifically, the profile includes information related to setting values of respective setting items which are necessary to execute the function.

When the function registered as the shortcut is the "Scan to USB" function, the profile includes a setting of execution/inexecution of the both-side scanning, a color setting, a scanning resolution, a file type and a USB port of a destination where the scan data is to be stored.

The profile is generated for individual shortcut when the shortcut is registered, and stored for example in NVRAM 14. When one of the shortcut execution keys is depressed, a shortcut process based on the shortcut assigned to the shortcut execution key and registered with the MFP 10 is executed. Specifically, when the shortcut process is executed, the profile which is associated with the shortcut execution key and necessary for executing the shortcut is retrieved from the NVRAM 14. Then, in accordance with the thus retrieved profile, the shortcut process is executed.

By registering a shortcut, a particular scan data processing function can be executed with a relatively small number of operation steps. It may be possible that a registered function is automatically started and completed without requiring a user operation merely by one depression of a shortcut execution key. It is noted, however, some users may wish, or depending on types of functions, it is preferable that the process is paused before starting the process or before completion of the process so that the user can determine whether the process proceeds as intended. For example, when the "Scan to E-mail" function is being executed, there may be a user who wishes that a destination address is displayed at least before an e-mail is transmitted so that the e-mail is transmitted after an address confirming operation by the user is executed in order to prevent the e-mail from being transmitted to a wrong address.

In consideration of the above, the MFP 10 according to the illustrative embodiment has a one-touch function which enables the user to select, for each of the registered functions, whether the registered function is executed in accordance with a normal procedure or a simplified procedure. The normal procedure is defined as a procedure including confirming processes which require the confirming operation by the user regarding the processes to be executed. The simplified procedure is a procedure which does not require the confirming operation by the user. That is, according to the simplified procedure, when the shortcut execution key is depressed, the function associated with the shortcut execution key is started and completed automatically without interruption of the confirming operations. According to the illustrative embodiment, the one-touch function can be enabled or disabled. That is, when the one-touch function is disabled, the processes are executed in accordance with the normal procedure, while the processes are executed in accordance with the simplified process when the one-touch function is enabled.

In the preference stand-by screen 60 shown in FIG. 2, the one-touch functions for the shortcuts assigned to the shortcut execution keys 71, 72 and 75 respectively displayed in the first, second and fifth key display areas 61, 62 and 65 are disabled. In contrast, the one-touch function for the shortcut assigned to the shortcut execution key 76 which is displayed in the sixth key display are 66 is enabled. It is noted that, according to the illustrative embodiment, the disable/enable setting of the one-touch key can be made individually (i.e., for each shortcut). According to the illustrative embodiment, whether the one-touch function is disabled or enabled can be recognized on the preference stand-by screen 60 based on a color of each shortcut execution key. Specifically, according to the illustrative embodiment, the shortcut execution keys of the shortcuts of which the one-touch function is disabled are shown with thin-gray color, while the shortcut execution keys of the shortcuts of which the one-touch function is enabled are shown with green color. In FIG. 2, green color is represented by dark-gray color.

(4) Combined Shortcut

When the MFP 10 is used, the user may wish to execute multiple shortcuts sequentially. In particular, regarding the shortcuts related to the scan data processing function, the user may wish to apply multiple types of processes to the same scan data. For example, there would be a case where the user may wish to scan an image on an original, and store the scan data in the USB memory, and transmit the same by e-mail.

In this case, the user-wished processes can be achieved by executing the Scan to USB shortcut process and the Scan to E-mail shortcut process. However, when the above two shortcut processes are executed, the user needs to set the same original to the MFP 10 twice, for each shortcut process, although the original subject to scan is the same original, and the MFP 10 is also operated to scan the same original twice.

In order to avoid the above redundancy, the MFP 10 according to the illustrative embodiment is configured such that a shortcut for executing a process in which multiple scan data processing functions are combined can be registered. In the following description, such a shortcut (i.e., the shortcut corresponding to multiple scan data processing functions which are combined) will be referred to as a combined shortcut. Further, a shortcut execution key to which the combined shortcut is assigned will be referred to as a combined shortcut execution key.

According to the illustrative embodiment, for example, the "Scan to USB" function and the "Scan to E-mail" function can be registered as a single combined shortcut. Further, when a combined shortcut process based on the above combined shortcut is executed, the two functions are sequentially executed except that scanning of the original is executed once. That is, as scanning of the original is executed once to generate the scan data. Thereafter, the thus generated scan data is used in executing both the "Scan to USB" function and the "Scan to E-mail" function.

(5) Registration of Combined Shortcut

According to the illustrative embodiment, there are mainly two methods of registering the combined shortcut. A first method is to use a first combined shortcut registration patter, and a second method is to use a second combined shortcut registration pattern.

(5-1) First Combined Shortcut Registration Pattern

The first combined shortcut registration patter is a pattern of generating and registering one combined shortcut by combining multiple existing shortcuts. An example the first combined shortcut registration patter will be described with referring to FIGS. 3 and 5.

After the MFP 10 is powered on and a particular start-up process is executed, a basic stand-by screen 40 as shown in FIG. 3A is displayed on the display 23. In the basic stand-by screen 40, a facsimile mode key 41, a copy mode key 42, the scanning mode key 43, a menu key 44, a shortcut key 45 and the like are displayed. When one of the mode keys 41, 42 and 43 is depressed, processes necessary to achieve the function corresponding to the depressed key can be executed sequentially and finally the function corresponding to the depressed key can be achieved.

When the shortcut key 45 is depressed, the preference stand-by screen 60 as shown in FIG. 2 is displayed. Accordingly, when the user wishes to execute a shortcut process or register a new shortcut process after the start-up of the MFP 10, the user only has to depress the shortcut key 45 within the basic stand-by screen 40.

When the menu key 44 is depressed, a menu screen 50, which is shown on a right-hand side of the basic stand-by screen 40 in FIG. 3B, is displayed. In the menu screen 50, keys for setting various setting items and confirming setting statuses of the setting items of the MFP 10 are displayed, among which is a shortcut setting key 51. By depressing the shortcut setting key 51, the user can confirm contents of registered shortcuts, change the contents of the registered shortcuts, and create a combined shortcut by combining multiple shortcuts which have been registered.

When the user depressed the shortcut setting key 51, a shortcut selection screen 53 shown in FIG. 3C is displayed. The shortcut selection screen 53 appears similar to the preference stand-by screen 60 shown in FIG. 2 except for characters displayed on an upper end part of the screen 53, and six keys corresponding to the current registration condition are displayed on the six keys display areas 61-66, respectively. By switching the tabs, displayed contents of the keys are changed.

When the user select a first one of the shortcuts (i.e., a base shortcut) the user intends to combine from among the shortcuts shown in the shortcut selection screen 53 and depressed the selected shortcut execution key 72, the process selection screen as shown in FIG. 3D is displayed. In the following description, it is assumed that the shortcut execution key 72 displayed in the second key display area 62 is depressed, and the shortcut assigned to the depressed shortcut execution key 72 will be referred to as a second shortcut.

In the process selection screen 55, multiple selection candidates (i.e., multiple keys) allowing the user to select a process corresponding to the shortcut selected in the shortcut selection screen 53 are displayed. Among the keys displayed in the process selection screen 55, there is a combining key 56. When the user wishes to combine another shortcut to the second shortcut selected in the shortcut selection screen 53 to create one combined shortcut, the user has only to depress the combining key 56 displayed in the process selection screen 55. When the combining key 55 is depressed, a combination target selection screen 80 as shown in FIG. 3E is displayed.

The combination target selection screen 80 is similar to the shortcut selection screen 53 except for the characters displayed on an upper end part of the screen. When the user selects a shortcut the user intends to combine with the second shortcut, which is the base shortcut, from the combination target selection screen 80 and depresses the shortcut execution key corresponding to the selected shortcut, a combination confirming screen 85 as shown in FIG. 3F is displayed. In the following description, it is assumed that the user has depressed the shortcut execution key 71 shown in the first key display area 61 in the combination target selection screen 80. Further, the shortcut assigned to the shortcut execution key 71 will be referred to as a first shortcut.

In the combination confirming screen 85, a text notifying that the selected two shortcuts are combined, and an OK key 86. When the user depresses the OK key 86, a storing method confirming screen 90 as shown in FIG. 4A is displayed.

Further, when the OK key 86 is depressed, a combination profile which is commonly used among the multiple scan data processing functions to be combined is generated. In the combination profile, various setting values necessary to execute scanning the original are set. According to the illustrative embodiment, at least the setting of execution/inexecution of the both-side scanning, the color setting, the scanning resolution are included in the combination profile.

When there is a common setting item which is a setting item included in all of the shortcuts subject to be combined and has the same setting value, the common item can be set as a combination profile with maintaining the setting value thereof. In contrast, when there is a setting item which is included in all the shortcuts subject to be combined but the items in respective shortcuts have different setting values, how the setting values are handled can be determined in various ways. For example, the setting value of one of the shortcuts subjected to be combined may be used as the setting value of the common setting item. Further, in such a case, selection of the setting value of which of the multiple shortcuts subject to be combined can be determined in various ways. According to the illustrative embodiment, for example, for the color setting, if setting values include both the color and monochromatic settings, the setting value representing the color (not monochromatic) is prioritized and set as the combination profile. For another example, regarding the scanning resolution, the setting value representing the higher resolution is prioritized and set as the combination profile.

The storing method confirming screen 90 is a screen encouraging the user to select whether the combined shortcut which will be created is stored by overwriting the existing first shortcut or the second shortcut, or newly registered as a newly created combines shortcut. On the storing method confirming screen 90, an overwrite key 91 and a newly store key 92. According to the illustrative embodiment, when the user depresses the overwrite key 91, the newly created shortcut overwrites the shortcut of the base selected in the shortcut selection screen 53. Therefore, when the overwrite is selected in the above example, the second shortcut corresponding to the shortcut execution key 72 displayed in the second key display area 62 is replaced with the newly created combined shortcut.

When the overwrite key 91 is depressed, a rename confirming screen 100 shown in FIG. 4B is displayed. The rename confirming screen 100 is for encouraging the user to select whether the name of the existing second shortcut is used as a name of the combined shortcut or the name is changed, and a request key 101 and a refuse key 102 are displayed thereon. When the request key 101 is depressed, a name input screen 110 shown in FIG. 4C is displayed. Through the name input screen 110, the user can input a desired name as the name of the currently creating combined shortcut. When the user has completed inputting the desired name of the combined shortcut within a name input frame 111 and depresses the OK key 112, the combined shortcut is created and registered. Then, the preference stand-by screen 60 shown in FIG. 4D is displayed. As seen from FIG. 4D, in the preference stand-by screen 60 shown in FIG. 4D, a new combined shortcut key 79 is displayed in the second key display area 62. Further, on the combined shortcut key 79, a combine icon 79a indicating the a combined shortcut is assigned is displayed. Further, the shortcut execution key 71 previously displayed (before combined with the shortcut execution key 72) in the first key display area 61 has been deleted, and the shortcut registration key is displayed in the first key display area 61 instead.

When the refuse key 102 of the rename confirming screen 100 is depressed, the combined shortcut is created and registered without displaying the name input screen 110, and thereafter, the preference stand-by screen 60 is displayed. Also in this case, the shortcut registration key is displayed in the first key display area 61, and the combined shortcut execution key 79 of the combined shortcut is displayed in the second key display area 62. It is noted, however, in this case, the name of the combined shortcut key is the same as the name of the second shortcut assigned to the second key display area 62.

When the newly store key 92 of the storing method confirming screen 90 is depressed, the storage location selecting screen 120 shown in FIG. 4E is displayed. In the storage location selecting screen 120, the user can select one of the shortcut registration keys to which a shortcut has not yet been assigned in order to assign the combined shortcut to the selected shortcut registration key. In the example shown in FIG. 4E, there are two shortcut registration keys.

For example, when the shortcut registration key 73 displayed in the third key display area 63, the combined shortcut is created and registered after the name input screen 110 is displayed, and thereafter, the preference stand-by screen 60 shown in FIG. 4G is displayed. As shown in FIG. 4G, a combined shortcut execution key 78 for executing the newly created combined shortcut is displayed in the third key display area 63 in the preference stand-by screen 60 shown in FIG. 4G.

(5-2) Second Combined Shortcut Registration Pattern

In a second combined shortcut registration pattern, a combined shortcut is created from the beginning without using the existing shortcuts, and is registered.

A registration method according to the second combine shortcut registration patter will be described referring to FIGS. 5A-5F and 6A-6D.

As mentioned above, when the shortcut key 45 in the basic stand-by screen 40 (see FIG. 3A) is depressed, the preference stand-by screen 60 shown in FIG. 5A is displayed. At this stage, if the user depresses the shortcut registration key 73 displayed in the third display area 63 in order to register a new combined shortcut and make a shortcut execution key corresponding to the newly registered shortcut displayed, for example, in the third key display area 3, the function selection screen 130 as shown in FIG. 5B. In the function setting screen 130, multiple keys respectively corresponding to functions of which shortcuts can be registered are displayed. Among such keys, there is a scan selection key 131. When the user depresses the scan selection key 131, a shortcut related to the scan data processing can be registered.

That is, when the scan selection key 131 is depressed, a scan type selection screen 140 shown in FIG. 5C is displayed. In the scan type selection screen 140, multiple keys respectively corresponding to multiple types of scan data processing functions, In the example shown in FIG. 5C, an STN key representing the "Scan to Network" function, an STE key 141 representing the "Scan to Email" function, an STF key representing the "Scan to FTP" function, and an STU key 142 representing the "Scan to USB" function are displayed. Further, as shown in FIG. 3B, a check box is displayed on the left of each key.

The user is allowed to select multiple scan data processing functions which the user wish to combine from among the scan type selection screen 140. Selection can be made by depressing the keys of checking the check boxes corresponding to the scan data processing functions the user wish to combine. FIGS. 5A-5C shows a case where the STE key 141 and the STU key 142 are selected, and thereby the corresponding check boxes 143 and 144 are checked. That is, the scan type selection screen 140 shows a state where the tow scan data processing functions (i.e., the "Scan to E-mail" function, and the "Scan to USB" function) are selected as objective functions the user wishes to combine.

When the two scan data processing functions as shown in FIGS. 5A-5C are selected and the OK key 146 is depressed in the scan type selection screen 140, setting confirmation screens are displayed which allows the user to confirm and/or modify the setting values for each of the selected functions.

Firstly, a first setting confirmation screen 150 shown in FIG. 5D is displayed. In the first setting confirmation screen 150, setting information 151 which shows setting items and setting values thereof related to the "Scan to USB" function are listed, a setting change key 152 and a setting store key 153 are displayed. With the first setting confirmation screen 150, the user can confirm the setting state of the "Scan to USB" function which the user is registering as a shortcut. When the setting change key 152, a setting change screen is displayed so that the user can change the setting through the setting change screen. Such a screen is of well-known type and will not be described in detail for brevity. When the setting store key 153 is depressed, the setting state currently displayed is confirmed, and the setting confirmation screen for the next one of the selected functions is displayed.

According to the illustrative embodiment, the screen is switched to the a second setting confirmation screen 160 shown in FIG. 5E. In the second setting confirmation screen 160, setting information 161 which shows setting items and setting values thereof related to the "Scan to E-mail" function are listed, a setting change key 162 and a setting store key 163 are displayed. With the second setting confirmation screen 160, the user can confirm the setting state of the "Scan to E-mail" function which the user is registering as a shortcut. When the setting change key 162, a setting change screen is displayed so that the user can change the setting through the setting change screen. Such a screen is of well-known type and will not be described in detail for brevity. When the setting store key 163 is depressed, the setting state currently displayed is confirmed, and a combine confirmation screen 170 shown in FIG. 5F

When the setting store key 153 is depressed in the first setting confirmation screen 150, the profile representing the setting values of the Scant to USB as confirmed is generated. In the example described below, it is assumed that the both-side scanning is set to be used, the color setting is set to the monochromatic color, the resolution is set to 150 dpi (dots per inch), and the file type is set to the PDF (portable document format).

When the setting store key 163 is depressed in the second setting confirmation screen 160, the profile representing the setting values of the "Scan to E-mail" function as confirmed is generated. In the example described below, it is assumed that the both-side scanning is used, the color setting is set to color, the resolution is set to 400 dpi, and the file type is set to jpg which is an extension of a JPEG (joint photographic experts group) format file.

In the combine confirmation screen 170, the setting information 171 of each of the multiple scan data processing functions which are subject to be combined, and an OK key 172. The user can confirm the setting state of each of the multiple scan data processing functions (e.g., the "Scan to USB" function, and the "Scan to E-mail" function) which are subject to be combined with the combine confirmation screen 170. When the user depresses the OK key 172, a name input screen 110 shown in FIG. 6A is displayed.

When the user depresses the OK key 172 in the combine confirmation screen 170, the combination profile is generated. According to the illustrative embodiment, the combined profile including whether the both-side scanning is used, the color setting, and the resolution when scanning is executed, which are necessary setting values when scanning is executed, is generated.

According to the above assumption, in each of the functions to be combined, the both-side scanning is set to be used. Accordingly, in the combined profile, the both-side scanning is set to be used. Regarding the color setting, "monochromatic" is used in one function and "color" is used in the other function. Therefore, in the combined profile, the setting of "color" is prioritized and is set. Further, regarding the scanning resolution, "100 dpi" is set in one function and "400 dpi" is used in the other function. Therefore, in the combined profile, the scanning resolution is set to "400 dpi" which is the highest resolution among the functions to be combined and prioritized.

When the name of the combined shortcut is inserted in the name input screen shown in FIG. 6A, and the OK key 112 is depressed, a one-touch start setting screen 180 shown in FIG. 6B is displayed. The one-touch start setting screen 180 is a screen encouraging the user to select whether a shortcut process based on the combined shortcut in accordance with the normal procedure or the simplified procedure, and a validate key 181 and an invalidate key 182 are displayed thereon.

In the one-touch start setting screen 180, when the user depresses the validate key 181 in order to enable the one-touch start, the combined shortcut is created and registered, and the preference stand-by screen 60 shown in FIG. 6C is displayed. In the preference stand-by screen 60, a combined shortcut execution key 191 to which the newly registered combined shortcut is assigned is displayed. Further, on the combined shortcut execution key 191, a combine icon 191*a* indicating the combined shortcut is assigned is displayed. Furthermore, the combined shortcut execution key 191 is displayed in green to indicate that the one-touch start is enabled.

When the invalidate key 182 is depressed in the one-touch start setting screen 180, the combine shortcut is created and registered, and the preference stand-by screen 60 shown in FIG. 6D is displayed. In the preference stand-by screen 60, a combined shortcut execution key 201 to which the newly registered shortcut is assigned in gray to indicate that the one-touch start is disabled.

When only one of the scan data processing functions is selected and the OK key 146 is depressed in the scan type selection screen 140 shown in FIG. 5C, the process proceeds to a registration procedure to register a shortcut to execute the only one scan data processing function. The registration procedure is basically similar to the registration procedure of the combined shortcut except that the combine confirmation screen 170 is not displayed. That is, for the selected one scan data processing function, setting of the setting values by the user, a confirmation process, generation of the profile based on the settings, input of the shortcut name, setting whether the one-touch start is enable/disabled are executed, and the shortcut is generated and stored.

(6) Shortcut Execution Pattern

Next, referring to FIGS. 7A-7F and 8A-8D, a process when the combined shortcut execution key as registered will be described. According to the illustrative embodiment, the combined shortcut is executed according to mainly one of three execution patterns A-C depending on the number of functions combined as the combined shortcut, a setting status of the one-touch start, and the like.

(6-1) Execution Pattern A

An execution patter A is an execution pattern when a shortcut process of the combined shortcut, in which two scan data processing functions are combined and the one-touch start is enabled, is executed.

Figure 7A:
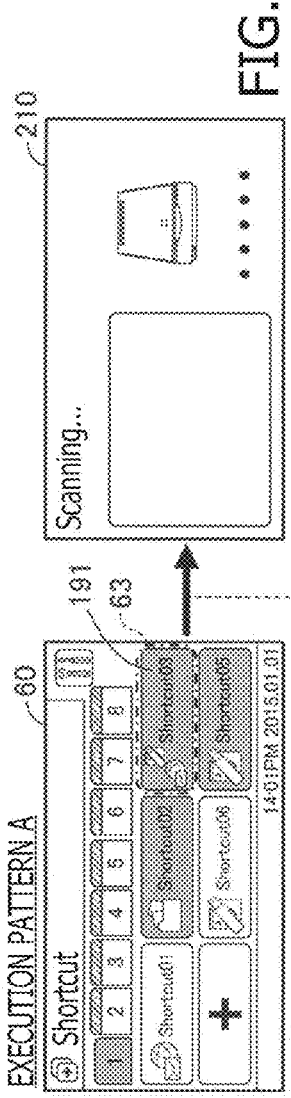
FIGS. 7A and 7B show a chart illustrating an execution pattern A of the combined shortcut according to the illustrative embodiment.

For example, it is assumed that, as shown in FIG. 7A, a combined shortcut execution key 191 for a combine shortcut in which the one-touch start is enabled is displayed at the third key display area 63 in the reference stand-by screen 60. Further, it is also assumed that the combined shortcut has been generated by combining two scan data processing functions.

Under the above state, when the combined shortcut execution key 191 displayed at the third key display area 63 is depressed in the preference stand-by screen 60 shown in FIG. 7A, the two data processing functions registered as the combined shortcut are sequentially executed in accordance with the simplified procedure. During execution of the combined shortcut, a processing screen 210 is displayed.

It is noted that scanning of the original during execution of the combined shortcut is executed once in accordance with the combination profile thereof. That is, in the above example, scanning of the original is executed, in accordance with the combined profile, such that the both-side scanning is used at the scanning resolution of 400 dpi. Then, based on the scan data obtained by scanning, a PDF data is generated and output to the USB for the "Scan to USB" function, while the JPEG data is generated and attached to an e-mail, which is transmitted to a designated address for the "Scan to E-mail" function.

(6-2) Execution Pattern B

An execution pattern B is an execution pattern when a shortcut process of the combined shortcut, in which two scan data processing functions are combined and the one-touch start is disabled, is executed.

Figure 7B:

For example, it is assumed that, as shown in FIG. 7B, a combined shortcut execution key 79 for a combine shortcut in which the one-touch start is disabled is displayed at the second key display area 62 in the reference stand-by screen 60. Further, it is also assumed that the combined shortcut has been generated by combining two scan data processing functions.

Under the above state, when the combined shortcut execution key 79 displayed at the second key display area 62 is depressed in the preference stand-by screen 60 shown in FIG. 7B, the two data processing functions registered as the combined shortcut are sequentially executed in accordance with the normal procedure.

That is, firstly a setting confirmation screen 220 regarding the "Scan to USB" function is displayed so that the user can confirm the setting status regarding the "Scan to USB" function. When the setting confirmation screen 220 is displayed, the user can change the setting by depressing a setting change key 221. Further, after the user makes changes to the setting, when a new registration key 222 is depressed, the setting of the Scant to USB function is updated to the changes setting. Thereafter, when an OK key 223 in the setting confirmation screen 220 for the "Scan to USB" function is depressed, another setting confirmation screen 230 regarding the "Scan to E-mail" function is displayed which enables the user to confirm the current status of the setting regarding the "Scan to E-mail" function. Similarly to the above, when the user depressed the setting change key 221, the user can change the setting of the "Scan to E-mail" function. Further, by depressing the new registration key 232, the setting can be updated to the changed setting. Thereafter, as the user depresses a start key 233 in the setting confirmation screen 230 for the "Scan to E-mail" function, the scan data processing functions registered with the combined shortcut are sequentially executed. During execution of the combined shortcut, the processing screen 210 is displayed.

(6-3) Execution Pattern C

An execution pattern C is an execution pattern when a shortcut process of the combined shortcut, in which three or more scan data processing functions are combined and the one-touch start is disabled, is executed.

For example, it is assumed that, as shown in FIG. 8A, a combined shortcut execution key 79 for a combine shortcut in which the one-touch start is disabled is displayed at the second key display area 62 in the reference stand-by screen 60. Further, it is also assumed that the combined shortcut has been generated by combining three or more scan data processing functions.

Under the above state, when the combined shortcut execution key 79 displayed at the second key display area 62 is depressed in the preference stand-by screen 60 shown in FIG. 8A, the data processing functions registered as the combined shortcut are sequentially executed in accordance with the normal procedure.

For example, an execution function display screen 240 as shown in FIG. 8B is displayed. In this example, three setting confirmation keys 241, 242 and 243 respectively indicating three combined scan data processing functions are displayed in the execution function display screen 240. When one of the setting confirmation keys 241, 242 and 243 is depressed, a setting confirmation screen 250 showing setting information for the data processing function corresponding to the depressed setting confirmation key (241, 242 or 243) is displayed.

The user can confirm the settings of respective scan data processing functions through the setting confirmation screen 250. Further, the user can change the settings of respective scan data processing functions by a setting change key 251. When a return key 252 displayed in the setting confirmation screen 250 is depressed, the screen is switched to the execution function display screen 240. Then, when a start key 244 in the execution function display screen 240 is depressed, the scan data processing functions registered as the combined shortcut are sequentially executed. During execution of the combined shortcut, the processing screen 210 is displayed.

(7) Shortcut Setting Process

Next, a shortcut setting process executed by the CPU 11 of the MFP 10 will be described referring to FIG. 9. As the CPU 11 executes the shortcut setting process shown in FIG. 9, registration of the combined shortcut in accordance with the first combined shortcut registration pattern, which is described referring to FIGS. 3A-3F and 4A-4G, is achieved.

As shown in FIGS. 3A-3F, when the screen is changed from the basic stand-by screen 40 to the menu screen 50, and the shortcut setting key 51 in the menu screen 50 is depressed, the CPU 11 executes the shortcut setting process shown in FIG. 9. When the shortcut setting process is started, the CPU 11 displays the shortcut selection screen 53 (S110), and receives the user operation on the shortcut selection screen 53 to select the shortcut subject to be changed. When the combined shortcut is created, the shortcut selecting in S120 serves as the base shortcut of the combined shortcut.

In S130, the CPU 11 displays the process selection screen 55, and the CPU 11 determines whether the combining key 56 of the process selection screen 55 is depressed (S140). When a key other than the combining key 56 is depressed (S140: NO), the CPU 11 executes a process corresponding to the depressed key in S260, and terminates the shortcut setting process.

When the combining key 56 is depressed (S140: YES), the CPU 11 displays the combination target selection screen 80 (S150), and receives the user operation to select the shortcut subject to be combined. When the shortcut subject to be combined is selected in the combination target selection screen 80, the CPU 11 generates the combination profile based on the profiles of the base shortcut, which is selected in S120, and the shortcut subject to be combined, which is selected in S160. It is noted that, strictly speaking, S170 is executed when the OK key 86 in the combination confirming screen 85 (see FIG. 3F) is depressed. However, in FIG. 9, the above confirming process is omitted for brevity.

After the combination profile is generated, the CPU 11 displays the storing method confirming screen 90 in S180. Thereafter, the CPU 11 determines whether the overwrite key 81 or the newly store key 92 in the storing method confirming screen 90 is depressed (S190). When it is determined that the over write key 91 is depressed, the CPU 11 proceeds to S210. When it is determined that the newly store key 92 is depressed, the CPU 11 executes a storage location determining process in S200 and proceeds to S210. It is noted that the storage location determining process in S200 is a process displaying the storage location selecting screen 120 shown in FIG. 4E, and receives the user operation on the storage location selecting screen 120 to select a location to which the combination profile execution key is assigned.

In S210, the CPU 11 displays the name input screen 110. In S220, the CPU 11 receives the user's input of the name of the combined shortcut in the name input screen 110. In S230, the CPU 11 receives the user's operation of the setting of enabling/disabling of the one-touch start. In S240, the combined shortcut is created and registered. In S250, the CPU 11 displays the preference stand-by screen 60 including the combined shortcut execution key for the shortcut registered in S240.

(8) Shortcut Registration Process

Next, a shortcut registration process which is executed by the CPU 11 of the MFP 10 will be described referring to FIG. 10. As the CPU 11 executes the shortcut setting process shown in FIG. 10, registration of a combined shortcuts in accordance with the second combined shortcut registration pattern, which is described with reference to FIGS. 5A-5F and 6A-6D, is done.

When the shortcut registration key in the preference stand-by screen 60 shown in FIG. 5A is depressed, the CPU 11 executes the shortcut registration process shown in FIG. 10. In the shortcut registration process, the CPU 11 displays the function selection screen 130 (see FIG. 5B). In S320, the CPU 11 determines whether the scanning function is selected, that is, whether a scan selection key 131 in the function selection screen 130 is depressed. When it is determined that a function other than the scanning function is selected (S320: NO), the CPU 11 executes a process to create a shortcut for the selected function in S380, and then proceeds to S390. In S380, for example, the CPU 11 executes processes to confirm setting items and to set setting values thereof regarding the function selected in the function setting screen 130, generates the profile based on the settings made in S380, and stores the thus generated profile. Accordingly, execution of S380 means a shortcut corresponding to one function (not a combined shortcut) is generated.

When the scanning function is selected (S320: YES), the CPU 11 displays the scan type selection screen 140 in S330, and receives the user's selection of scan type (i.e., the type of scan data processing function) to be registered as a shortcut in S340. When the user depressed the OK key 146 in the scan type selection screen 140, the CPU 11 determines whether multiple scan types are selected in the scan type selection screen 140 (S340). When the number of selected scan type is one (S340: NO), the CPU 11 proceeds to S380. When multiple scan types are selected (S340: YES), the CPU 11 proceeds to S350.

In S350, the CPU 11 executes the user's confirmation of the setting items, processes for setting, generation of a profile based on the setting and storing of the generated profile for each of selected scan type. Display of the setting confirmation screens 150 and 160, the combine confirmation screen 170 shown in FIGS. 5D, 5E and 5F are executed in S350. Thereafter, when the user depresses the OK key 172 in the combine confirmation screen 170, the CPU 11 fixes combination of the shortcuts in S360, and generates the combination profile based on the profile of each of the shortcuts subject to be combined and store the same in S370.

In S390, the CPU 11 displays the name input screen 110, and receives the user's input of the name of the combined shortcut in S400. Then, the CPU 11 displays the one-touch start setting screen 180 in S410. In S420, the CPU 11 determines which of the validate key 181 and the invalidate key 182 is depressed. When the validate key 181 is depressed, the CPU 11 enables the one-touch start and generates and store the combined shortcut in S430. When the invalidate key 182 is depressed, the CPU 11 disables the one-touch start and generates and store the combined shortcut. In S450, the CPU displays the preference stand-by screen 60 which includes a shortcut execution key for the combined shortcut registered in S430 or S440.

(9) Shortcut Execution Process

Next, referring to FIG. 11, a shortcut execution process executed by the CPU 11 of the MFP 10 will be described. As the CPU 11 executes the shortcut execution process shown in FIG. 11, the shortcut process, which has been described referring to FIGS. 7A-7F is executed in accordance with one of the execution patterns A and B. Regarding pattern C shown in FIGS. 8A-8D, a flowchart will be omitted since this process is relatively simple.

Figure 7C:
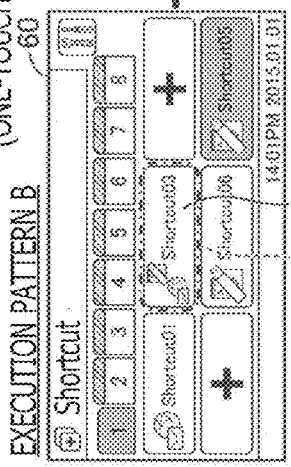
FIGS. 7C-7F show a chart illustrating an execution pattern B of the combined shortcut according to the illustrative embodiment.

When the shortcut execution key is depressed in the preference stand-by screen 60 shown in FIG. 7A or 7C, the CPU 11 executes the shortcut execution process shown in FIG. 11. When the shortcut execution process is started, the CPU 11 determines whether the depressed shortcut execution key is the combined shortcut execution key in S510. When it is determined that the depressed shortcut execution key is not the combined shortcut execution key (S510: NO), the CPU 11 executes the process corresponding to the shortcut assigned to the depressed shortcut execution key in S650.

When it is determined that the depressed shortcut execution key is the combined shortcut execution key (S510: YES), the CPU 11 determines whether the one-touch start is enabled in S520. When the one-touch start is enabled (S520: YES), the CPU 11 retrieves the combination profile in S530. Then, in S540, the CPU 11 executes scanning of the original once in accordance with the combination profile. In S550, the CPU 11 converts the scan data obtained by scanning to data according to a file format registered to the profile corresponding to each of the combined shortcuts (i.e., each of the data processing functions).

When it is determined that the one-touch start is disabled (S520: NO), the CPU 11 retrieves the profiles of the combined scan types in S560. In S570, the CPU 11 displays one unconfirmed profile, that is a profile to which the confirming process in S580 has not been executed. For example, one of the setting confirmation screens 220 and 230 in the execution pattern B (FIG. 7D or 7E) is displayed.

Figure 7D:
Figure 7E:
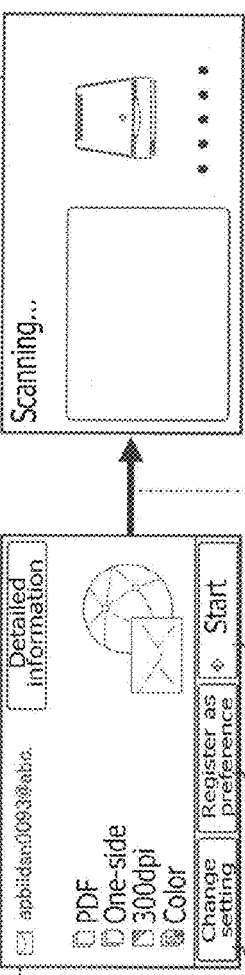

In S590, the CPU 11 receives the user's confirming operation (e.g., depressions of the OK key) for the profile displayed in S580. In S590, the CPU 11 determines whether the profile confirmation process in S580 has been executed for all the profiles of all the combined scan types. When it is determined that there is a scan type for which the profile confirmation process has not be executed (S590: NO), the CPU 11 returns to S570. When it is determined that the profile confirmation process has been completed (S590: YES), the CPU 11 proceeds to S600. It is noted that the setting confirmation screens 220 and 230 shown in FIGS. 7D and 7E are sequentially displayed. When, for example, the setting confirmation screen 230 related to the "Scan to E-mail" function is displayed, and the start key 233 is depressed, it is determined that the determination in S590 is YES, and the CPU 11 proceeds to S600.

In S600, the CPU 11 determines whether there is a profile of which setting has been changed during execution of S70-S590. When it is determined that no profile has been changed (S600: NO), the CPU 11 proceeds to S620. When it is determined that a profile of one of the scan types has been changed (S600: YES), the CPU 11 re-generates the combination profile and stores (overwrites, in this case) the same.

Figure 7F:
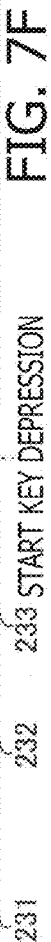

In S620, the CPU 11 retrieves the combination profile re-generated and stored in S610. Then, in S620, the CPU 11 executes scanning once in accordance with the combination profile retrieved in S620. Then, in S630, the CPU 11 executes scanning of the original once in accordance with the combination profile. In S640, the CPU 11 converts the scan data obtained by scanning to data according to a file format registered to the profile corresponding to each of the combined shortcuts (i.e., each of the data processing functions). During execution of S540 and S640, the processing screens 210 shown in FIGS. 7B and 7F are displayed, respectively.

(10) Effects of Embodiment

According to the MFP 10 described above, multiple shortcuts (i.e., shortcuts for multiple scan data processing functions) can be collectively registered with a single combined shortcut execution key. When the user depresses the combined shortcut execution key, multiple scan data processing functions register with the combined shortcut execution key are executed sequentially. It is noted that, although the multiple scan data processing functions are executed, scanning of the original is executed only once. That is, the scan data obtained by one scanning of the original is used for multiple scan data processing functions registered with the combined shortcut execution key.

Accordingly, when multiple shortcut processes with respect to the same original are to be executed, by registering the multiple shortcut processes with the combined shortcut, scanning of the original will not be unnecessarily repeated, but executed only once, and process efficiency as an entire process of multiple shortcut processes can be improved.

Further, according to the illustrative embodiment, as methods of registering the combined shortcut, there are provided two patterns: first combined shortcut registration patter and second combined shortcut registration pattern.

The first combined shortcut registration pattern is to generate and register one combined shortcut by selecting multiple shortcuts from among the existing shortcuts (see FIGS. 3A-3F, 4A-4G and 9). According to the first pattern, the user can register the combined shortcut easily.

The second combined shortcut registration pattern is to newly create the combined shortcut from the beginning (see FIGS. 5A-5F, 6A-6D and 10). That is, selection of multiple scan data processing functions subject to be combined, determining the setting values for each of the selected scan data processing function are newly executed. According to the second pattern, the user can register the combined shortcut by selecting only the necessary scan data processing functions with desired setting, efficiently.

The combined shortcut is executed basically one of three execution patterns A-C depending on the number of the combined scan data processing functions, a setting status of the one-touch function and the like. In other words, depending on how the combined shortcut is registered, the execution patter thereof can be determined. Accordingly, a high value-added MFP 10 in terms of registration and execution of the combined shortcut can be presented.

It is noted that the display 23 corresponds to an example of a display device according to aspects of the disclosures. The scanner 15 corresponds to an example of a scanner according to aspects of the disclosures. A configuration including the CPU 11, ROM 12, RAM 14 and NVRAM 14 as a whole corresponds to an example of a controller according to aspects of the disclosures. The process of displaying the preference stand-by screen 60 corresponds to an example of a key displaying process according to aspects of the disclosures. Each of the processes shown in FIGS. 9 and 10 corresponds to an example of a multiple function assigning process according to aspects of the disclosures. The process shown in FIG. 11 corresponds to an example of a multiple functions execution process according to aspects of the disclosures. Steps S320, S340 and S380 in FIG. 10 correspond to an example of a single function assigning process according to aspects of the disclosures. S650 in FIG. 11 corresponds to an example of a single function execution process according to aspects of the disclosures. S120 and S160 of FIG. 9 corresponds to an example of a multiple functions selection process according to aspects of the disclosures. S170-S240 in FIG. 9 corresponds to an example of a combining process according to aspects of the disclosures. S320 and S340 in FIG. 10 corresponds to an example of a first target selection process according to aspects of the disclosures. S380 of FIG. 10 corresponds to an example of a first setting process according to aspects of the disclosures. S330 of FIG. 10 corresponds to an example of a second target selection process according to aspects of the disclosures. S350 of FIG. 10 corresponds to an example of a second setting process according to aspects of the disclosures. S370 of FIG. 10 corresponds to an example of an enabling process according to aspects of the disclosures. The operation device 17 corresponds to an example of an input device according to aspects of the disclosures. S230 of FIG. 9 and S410 and S420 of FIG. 10 correspond to an example of a procedure selection process according to aspects of the disclosures. S230 of FIG. 9 and S430 and S440 of FIG. 10 correspond to an example of a procedure assignment process according to aspects of the disclosures. The process of displaying the execution function display screen 240 shown in FIG. 8B corresponds to an example of an image displaying process according to aspects of the disclosures. A process of receiving the user's operation to depress the setting confirmation keys 241-243 in the execution function display screen 240 in FIG. 8B corresponds to an example of an image selection process according to aspects of the disclosures. A process of receiving the user's operation to depress the start key 244 in the execution function display screen 240 in FIG. 8B corresponds to an example of an instruction receiving process according to aspects of the disclosures. A process of displaying the setting confirmation screen 250 in FIG. 8D corresponds to an example of a setting value display process according to aspects of the disclosures. The network I/F 19 and the network connection device 21 correspond to an example of a communication device according to aspects of the disclosures.

Other Embodiments

It is noted that the above-described embodiment is only an illustrative one and aspects of the disclosures should not be limited to the configuration described above, but can be modified in various ways.

(1) The combined shortcut may be created by combining three or more scan data processing functions. In such a case, the number of scanning operation need not be limited to one. For example, when the number of combined data processing functions is n, the number of scanning operations may be less than n (i.e., (n−1) or less).

(2) The method of creating the combination profile needs not be limited to a method described above, by can be created in a different way. For example, one of the profiles corresponding to the multiple functions subject to be combined may be used as the combination profile. Alternatively, the combination profile may be created in accordance with any other suitable rule.

(3) An execution procedure of the combined shortcut when the one-touch function is disabled needs not be limited to the procedure shown in FIGS. 7A-7F and 8A-8D. Regarding execution of the registered functions, confirmation processes and input processes required to the user may be determined arbitrarily.

(4) The execution pattern C shown in FIGS. 8A-8D is only an example of an execution pattern when the number of combined functions is three or more. When the number of combined functions is three or more, the execution pattern B shown in FIGS. 7C-7F may be employed. Further, the execution pattern B shown in FIGS. 7C-7F is only an example of an execution pattern when the number of combined functions is two and the one-touch start is disabled, and the execution pattern C may be employed in this case.

(5) It is noted that a component included in the illustrative embodiment may be modified such that a plurality of components which execute, as a whole, the same function. Further, a function realized by a plurality of components in the illustrative embodiment may be modified such that a single component execute the same function. Furthermore, at least a part of the configuration according to the illustrative embodiment may be replaced with well-known configuration having the same function. Optionally or alternatively, a part of the configuration according to the illustrative embodiment may be omitted. Still optionally or alternatively, at least a part of the configuration of the illustrative embodiment may be added to another embodiment or replace a component of another embodiment.

What is claimed is:

1. A function execution apparatus, comprising:
a display configured to display an image;
a scanner configured to scan an image on an original to generate scan data representing the image on the original; and
a controller configured to:
execute a first function in response to a user operation to select a first shortcut key, the first function executing a scanning operation to scan the image on the original and generate scan data and one of a transmitting operation to transmit the scan data to an external device and a storing operation to store the scan data in a storage different from the external device;
execute a second function in response to a user operation to select a second shortcut key, the second function executing the scanning operation to generate the scan data and an other of the transmitting operation using the scan data and the storing operation to store the scan data;
assign the first function and the second function to a multiple-function assigned key as a third shortcut key;
display a plurality of shortcut keys including the first shortcut key, the second shortcut key and the third shortcut key, on the display; and
execute, in response to a user operation to select the third shortcut key, the scanning operation and the one of the transmitting operation and the storing operation of the first function, skip the scanning operation of the second function, and execute the other of the transmitting operation and the storing operation of the second function using the scan data generated in the scanning operation of the first function.

2. The function execution apparatus according to claim 1, wherein the plurality of shortcut keys further includes a fourth shortcut key and fifth shortcut key,
wherein the controller is further configured to:
assign one particular function to the fourth shortcut key;
assign another particular function to the fifth shortcut key and
execute the one particular function assigned to the fourth shortcut key when a user operation to select the fourth shortcut key,
receive user selections of the fourth shortcut key and fifth shortcut key; and
combine the one particular function and the another particular function respective assigned to the fourth shortcut key and the fifth shortcut key into another multiple-function assigned key.

3. The function execution apparatus according to claim 2, wherein the controller is further configured to:
receive the user operation of selecting the one particular function subject to be assigned, the one particular function having at least one setting item necessary to execute the one particular function; and
receive setting values of the at least one setting item, validate one of setting values set for the another particular function subject to be assigned so as to be used as the received setting value of the setting item necessary for the scanning operation, and
execute the scanning operation using the validated setting value when the user operation to select the another multiple-function assigned key.

4. The function execution apparatus according to claim 3, further comprising an input device configured to receive an input operation by the user,
wherein the controller is further configured to:
receive the user selection of one of a normal procedure and a simplified procedure as a procedure assigned to the one of the plurality of shortcut keys, the normal procedure is executing functions assigned to the one of the plurality of shortcut keys with requiring a user operation to the input device, the simplified procedure is executing the functions assigned to the one of the plurality of shortcut keys without requiring the user operation to the input device; and
assign the received one of the normal procedure and the simplified procedure to the multiple-function assigned key or another multiple-function assigned key,
execute the functions assigned to the multiple-function assigned key or another multiple-function assigned key in accordance with one of the normal procedure and the simplified procedure assigned to the selected multiple-function assigned key or another multiple-function assigned key.

5. The function execution apparatus according to claim 4, wherein the controller is further configured to:
display images respectively indicating the functions assigned to the multiple-function assigned key or another multiple-function assigned key;
receive the user selection of one of the displayed images;
display a setting value of at least one setting item necessary to execute the functions corresponding to the selected image; and
receive a particular execution instruction operation after displaying the images, and
execute the functions assigned to the selected image indicating the functions assigned to the multiple-function assigned key or another multiple-function assigned key.

6. The function execution apparatus according to claim 1, wherein the first function and the second function have at least one setting item necessary to execute the first function and the second function,
wherein the controller is further configured to:
receive setting values of the at least one setting item for the first function and the second function;
validate one of setting values set to the first function and the second function so as to be used as the received setting value of the setting item necessary for the scanning operation, and
execute the scanning operation using the validated setting values when the user operation to select the multiple-function assigned key.

7. The function execution apparatus according to claim 1, further comprising a communication device configured to execute a data communication with an external device,
wherein the controller is further configured to:
transmit image data scanned by the scanning operation to the external device through the communication device as a function that can be assigned to the multiple-function assigned key.

8. The function execution apparatus according to claim 1, wherein the multiple-function assigned key has a function identifying image which enables the user to visually identify that multiple functions are assigned to the multiple-function assigned key.

9. A function execution method, comprising:
executing a first function in response to a user operation to select a first shortcut key, the first function executing a scanning operation to scan the image on the original and generate scan data and one of a transmitting operation to transmit the scan data to an external device and a storing operation to store the scan data in a storage different from the external device;
executing a second function in response to a user operation to select a second shortcut key, the second function executing the scanning operation to generate the scan data and another of the transmitting operation using the scan data and the storing operation to store the scan data;
assigning the first function and the second function to a multiple-function assigned key as a third shortcut key;
displaying a plurality of shortcut keys including the first shortcut key, the second shortcut key and the third shortcut key; and
executing, in response to a user operation to select the third shortcut key, the scanning operation and the one of the transmitting operation and the storing operation of the first function, skipping the scanning operation of the second function, and executing the other of the transmitting operation and the storing operation of the second function using the scan data generated in the scanning operation of the first function.

10. A function execution apparatus, comprising:
a display;
an image scanner configured to scan an image on an original and generate scan data representing the image on the original; and
a controller configured to:
display a first shortcut key and a second shortcut key on the display;

assign a first shortcut function to the first shortcut key, the first shortcut function including a scanning function and a first function, wherein the scanning function is executed by the image scanner;

assign a second shortcut function to the second shortcut key, the second shortcut function including the scanning function and a second function, the second function being different from the first function;

assign the functions associated with the first shortcut key and the second shortcut key to a third shortcut key;

in response to a designation of the third shortcut key:
execute the scanning function and the first function such that first scan data is generated by the image scanner and the first scan data is used in the first function; and after executing the scanning function according to the first shortcut key, executing the second function without executing the scanning function assigned to the second shortcut function, wherein the first scan data is used in the second function.

11. The function execution apparatus according to claim 10,
wherein the controller is configured to further:
store a first setting value in a memory in association with the first shortcut function, the first setting value being used in the scanning function,
in response to a designation of the third shortcut key, read the first setting value from the memory and execute the scanning function using the first setting value.

12. The function execution apparatus according to claim 11,
further comprising an input device configured to accept a user's input,
wherein the controller is configured to further:

receive a first user's input from the input device, the first user's input representing one of a first procedure and a second procedure; and determine whether the first user's input represents the first procedure or the second procedure;

wherein, when it is determined that the first user's input represents the first procedure, the first function is executed after completing the scanning function and receiving a second user's input from the input device, and the second function is executed after completing the first function and receiving a third user's input from the input device, and wherein, when it is determined that the first user's input represents the second procedure, the first function is executed immediately after completing the scanning function, and the second function is executed immediately after completing the first function.

13. The function execution apparatus according to claim 12,
wherein the controller is further configured to further execute:
when it is determined that the first user's input represents the first procedure, display a second setting value for the first function after completing the scanning function and before receiving the second user's input.

14. The function execution apparatus according to claim 10,
further comprising a communication interface for a data communication with an external device,
wherein the first function is for transmitting image data generated by the image scanner to the external device through the communication device.

15. The function execution apparatus according to claim 10,
wherein the third shortcut key has a function identifying image representing that multiple functions are assigned to the third shortcut key.

* * * * *